US009176729B2

(12) United States Patent
Mockus et al.

(10) Patent No.: US 9,176,729 B2
(45) Date of Patent: Nov. 3, 2015

(54) SYSTEM AND METHOD FOR PRIORITIZING AND REMEDIATING DEFECT RISK IN SOURCE CODE

(71) Applicant: Avaya Inc., Basking Ridge, NJ (US)

(72) Inventors: Audris Mockus, Summit, NJ (US); Randy L. Hackbarth, Western Springs, IL (US); John D. Palframan, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 62 days.

(21) Appl. No.: 14/046,409

(22) Filed: Oct. 4, 2013

(65) Prior Publication Data

US 2015/0100940 A1    Apr. 9, 2015

(51) Int. Cl.
*G06F 9/44* (2006.01)

(52) U.S. Cl.
CPC ... *G06F 8/70* (2013.01); *G06F 8/20* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 8,359,655 | B1 * | 1/2013 | Pham | 726/26 |
| 8,549,359 | B2 * | 10/2013 | Zheng | 714/38.11 |
| 2013/0159017 | A1 * | 6/2013 | Burkholder | 705/3 |
| 2013/0311968 | A1 * | 11/2013 | Sharma | 717/101 |
| 2014/0317591 | A1 * | 10/2014 | Rosomoff | 717/101 |

OTHER PUBLICATIONS

Non Patent document "Software Risk Management: A Practical Guide" [online], Feb. 2000 [retrieved on Jan. 17, 2015] retrieved from internet <http://energy.gov/sites/prod/files/cioprod/documents/Risk_Management.pdf>.*
Todd L. Graves, Alen F. Karr, J.S. Marron and Harvey "Predicting Fault Incidence Using Software Change History" [Online], Jul. 2000, [retrieved on Jan. 18, 2015], retrieved from Internet <http://ieeexplore.ieee.org/stamp/stamp.jsp?arnumber=859533>.*
Audris Mockus, "Large-scale code reuse in open source software" [online, 2007, [retrieved on Jan. 17, 2015] retrieved from Internet <http://ieeexplore.ieee.org/stamp/stamp.jsp?arnumber=4273087>.*
M. Cataldo, A. Mockus, J.A. Roberts, and J.D. Herbsleb, "Software dependencies, the structure of work dependencies and their impact on failures," *IEEE Transactions on Software Engineering*, 2009.

(Continued)

*Primary Examiner* — Don Wong
*Assistant Examiner* — Shirin Alizadeh (57) ABSTRACT

Disclosed herein are systems, methods, and computer-readable storage media for identifying and remediating risky source files. An example system configured to practice the method can gather data describing each file in a source code repository, and generate, using a weighted algorithm based on empirical relationships between the data and customer-found defects, a risk score for each file in the source code repository, wherein the weighted algorithm prioritizes factors based on predictiveness of defects. Then the system can generate a list of files having risk scores above a threshold, and make risk-mitigation recommendations based on the risk scores. A file can include a single file or a collection of files such as a module. The system can identify, for each file in the list of files having risk scores above the threshold, a respective risk type, and make the risk-mitigation recommendation for each file based on the respective risk type.

18 Claims, 4 Drawing Sheets

(56) References Cited

OTHER PUBLICATIONS

H.F. Chang and A. Mockus, "Constructing universal version history," in *ICSE'06 Workshop on Mining Software Repositories*, pp. 76-79, Shanghai, China, May 22-23, 2006.

T.L. Graves, A.F. Karr, J.S. Marron, and H. Sly, "Predicting fault incidence using software change history," *IEEE Transactions on Software Engineering*, 26(2), 2000.

R. Hackbarth, A. Mockus, J. Palframan, and D. weiss, "Assessing the state of software in a large enterprise," *Journal of Empirical Software Engineering*, 10(3):219-249, 2010.

Y. Kamei, E. Sinha, and N. Ubayashi, "A large-scale empirical study of just-in-time quality assurance," *IEEE Transactions on Software Engineering*, 2013.

A. Mockus, "Large-scale code reuse in open source software," in *ICSE'07 Intl. Workshop on Emerging Trends in FLOSS Research and Development*, Minneapolis, Minnesota, May 21, 2007.

A. Mockus, "Software support tools and experimental work," in V. Basili and et al., editors, *Empirical Software Engineering Issues: Critical Assessments and Future Directions*, vol. LNCS 4336, pp. 91-99, Springer, 2007.

A. Mockus, "Amassing and indexing a large sample of version control systems: towards the census of public source code history," in *6th IEEE Working Conference on Mining Software Repositories*, May 16-17, 2009.

A. Mockus, "Succession: Measuring transfer of code and developer productivity," In *2009 International Conference on Software Engineering, Vancouver*, CA, May 12-22, 2009. ACM Press.

A. Mockus, "Organizational volatility and its effects on software defects," in *ACM SIGSOFT/FSE*, pp. 117-126, Santa Fe, New Mexico, Nov. 7-11, 2010.

A. Mockus, "Quantifying and conveying risk in software development," In *1st Syposium on Mining Software Archives*, Monte Verita, Switzerland, Mar. 10-15, 2013, Keynote, (abstract only).

A. Mockus and D.M. Weiss, "Predicting risk of software changes," *Bell Labs Technical Journal*, 5(2):169-180, Apr.-Jun. 2000.

E. Shihab, A. Mockus, Y. Karnei, B. Adams, and A.E. Hassan, "High-impact defects: a study of breakage and surprise defects," in *Proceedings of the 19th ACM SIGSOFT symposium and the 13th European conference on Foundations of software engineering*, ESEC/FSE'11, pp. 300-310, New York, NY, USA, 2011. ACM.

\* cited by examiner

SYSTEM AND METHOD FOR PRIORITIZING AND REMEDIATING DEFECT RISK IN SOURCE CODE

BACKGROUND

1. Technical Field

The present disclosure relates to software development and more specifically to identifying high risk areas of code and proposing actions to mitigate or reduce the risk in those high risk areas.

2. Introduction

Software development is a complex process. As software projects expand, the teams working on the software projects also expand, and often include globally distributed teams of developers. Further, the source code itself is often divided, so that often very few developers have a complete picture of the entire software package under development. As the development of software products frequently transitions among globally distributed teams, the knowledge about the source code, design decisions, original requirements, and the history of troublesome areas can be lost or forgotten. A new team taking over development of a software project faces tremendous challenges to regain that knowledge. Loss of such knowledge is one source of introducing defects into software projects. Software defects can come from many other sources, as well.

Empirical data show that approximately 1% of project source code files are involved in more than 60% of customer reported defects. Because risk is omnipresent in software development, many development strategies are explicitly or implicitly designed to minimize risk. Existing solutions to mitigate risk do not correctly identify files with the highest risk. For example, static analysis warnings have only a weak relationship to customer reported software defects. Defect prediction algorithms can predict defects within individual files in a limited fashion, but do not operate on groups of files that account for the most defects. Each of these existing approaches has deficiencies in identifying and reducing risk in software development projects.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can identify and remediate the riskiest areas of the code, with a particular focus on providing tools and procedures needed for a successful remediation. The ability to identify such files can greatly reduce the risk, and can also reduce the investment of time and effort in locating and remediating risks. The risky file analysis can annotate the source code at the file and module level with the historic information needed to identify the high risk areas of the code and proposes actions to mitigate the risk.

The approach presented herein can identify and mitigate customer-defect risk posed by small parts of the code. The approach relies on an empirical relationship between a history of development and future customer-reported defects. In particular, that relationship shows that areas with large numbers of past changes and large numbers of authors who left the project tend to have much higher risk of having customer defects in the future. In one example, the analysis starts by collecting commits to the code (typically over a period of the past two to three years) and linking files in each commit with the associated change request, date, and author. The system can use the project's issue tracking database to identify customer reported defects and can use the company personnel directory or other similar source to determine if the author has left the company. The sample may be modified in multiple branches or even different repositories, such as when the same code is used in multiple projects. The system can link such files by identifying if, over the commit history, multiple versions of the file are similar or identical among the branches or repositories. A similar approach can identify files under an open source license by checking if any versions match a repository of known open source code. Once the equivalent files are identified, the system can report defects for all related files linked to each equivalence class. In addition to defects, the system can also track a number of other statistics to identify expert developers and to help them make the decisions on how to remediate the risk. The system can optionally match specific types of risk with developers having skill or experience in identifying and remediating that type of risk.

The system can identify, prioritize, remediate, and/or suggest remediation strategies for the riskiest areas of source code, with a particular focus on providing or identifying tools and procedures that can be applied for successful risk remediation.

Disclosed are systems, methods, and non-transitory computer-readable storage media for identifying candidate risky files based on empirical data of customer-found defects, and making recommendations to remediate the associated risk. An example system can gather data describing each file or collection of files, such as a module, in a source code repository. The system can analyze files to determine equivalence classes of files based on the most similar. For such files, the system can generate a collective risk score for each equivalence class. The system can identify equivalence classes or individual files as originating in open source, and can incorporate or retrieve previous risk analysis results for open source or other files, if the files have metadata (changes and customer defects) from a suitable risk analysis. Alternatively, the system can modify results from a previously performed risk analysis based on events and information for the time period after the last risk analysis.

The system can generate, using a weighted algorithm based on empirical relationships between the data and customer-found defects, a risk score for each file in the source code repository, wherein the weighted algorithm prioritizes factors based on predictiveness of defects. The system can consider factors including at least one of, but not limited to, file name, number of related files, number of differences in the file in a commit history, current number of lines of code, fraction of current number of lines of code to the maximum number of lines of code in the history of the file, number of authors, fraction of authors who have left active development of the file, number of customer found defects contributed by the file, ratio of customer found defects to the total number of change requests contributed by the file, indication of whether or not the file is an open source file, file path name uniquely identifying the file in the repository, author, creation date, last edit date, commit message, content of a latest version of the file, abstract syntax tree of a given version of the file, file size in bytes, or file size in lines of code.

The system can generate a list of files having risk scores above a threshold, and make a risk-mitigation recommendation for each file in the list based on the risk score. The system can optionally identify, for each file in the list of files having risk scores above the threshold, a respective risk type, and make the risk-mitigation recommendation for each file based on the respective risk type. The system can identify subject matter experts for files having risk scores above the threshold, and can further identify subject matter experts based on their respective experience or areas of expertise and the risk types. The system can present the list of files and corresponding risk-mitigation recommendations via at least one of an online portal or an interactive spreadsheet.

DETAILED DESCRIPTION

A system, method and computer-readable media are disclosed for identifying and remediating risky files or modules in source code. This approach focuses on risk reduction through prediction and selection of candidate risky files, and presenting that information and any associated risk indicators or checklists enable a developer to take action to reduce the risk. In addition, this approach considers not just individual files, but equivalence classes, so that the system can combine and evaluate risks potentially from multiple projects. This approach is more general and can apply beyond defect risks to include, for example, security vulnerabilities and lead time. This approach analyzes developer actions and customer-reported issues for the purpose of targeted and fine-grained quality improvement, which can be in the interest of both businesses and customers. This approach can reduce what would otherwise be a massive investment of developer time by directing developers' attention to limited, high-risk areas of the code.

Figure 1:
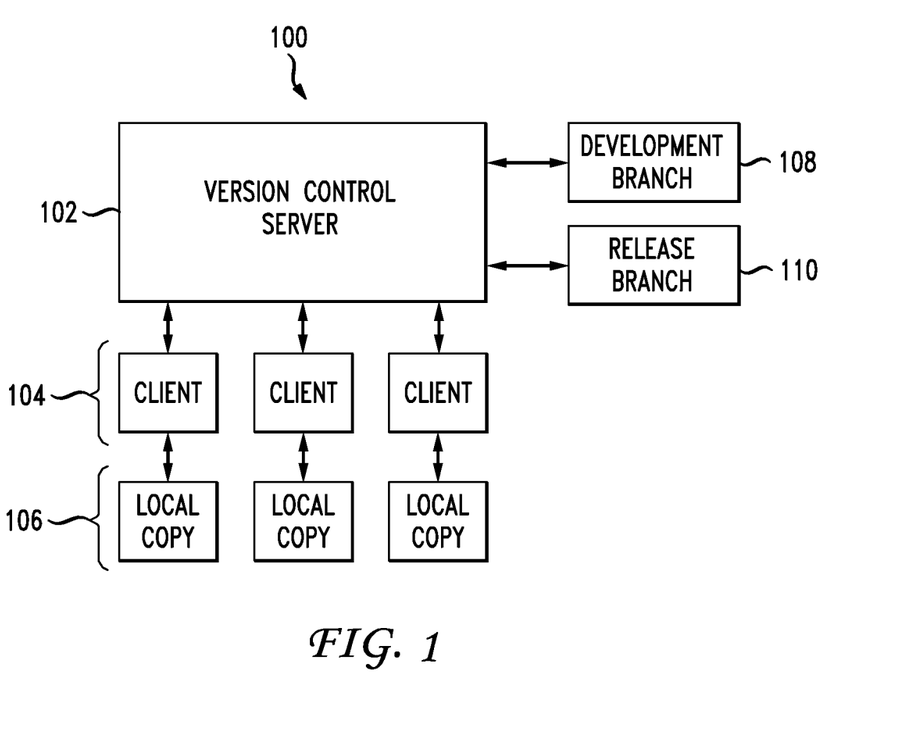
FIG. 1 illustrates an example version control server.

Practically all serious software developers and software development companies or organizations use some form of version control to track and manage different versions of source files as development progresses. FIG. 1 illustrates an example architecture 100 for a version control server 102. Various clients 104 interact with the version control server 102 to obtain source code from the version control server 102. The clients 104 maintain a local copy 106 of the source code, which a developer modifies. Then, after the developer has made a modification, the client 104 can commit that modification back to the main project through the version control server 102. Developers can create branches of a project source code to work on a particular release. The version control server 102 can support creation of a branch so that changes made on a branch can be tracked separately from changes made to another branch. Most projects have at least two branches: a development branch 108 with the latest features, and the release branch 110 for code that is in the product released to customers and that is unchanged except for important bug fixes. Change request/issue tracking systems can track the resolution of change requests (each commit is typically associated with a change request). A change request can be considered a software development task, such as a request to implement a new feature or to fix a defect. Customers report some defects and the version control server 102 can track attributes associated with a change request to determine if the change request was customer-reported. The version control server 102 can track and record other various data for each committed modification, such as the date and time, author, the type of change, any developer comments, differences between the pre- and post-modification source code, a corporate login for the author, and an identifier from the project's issue tracking system associated with the change.

Figure 2:
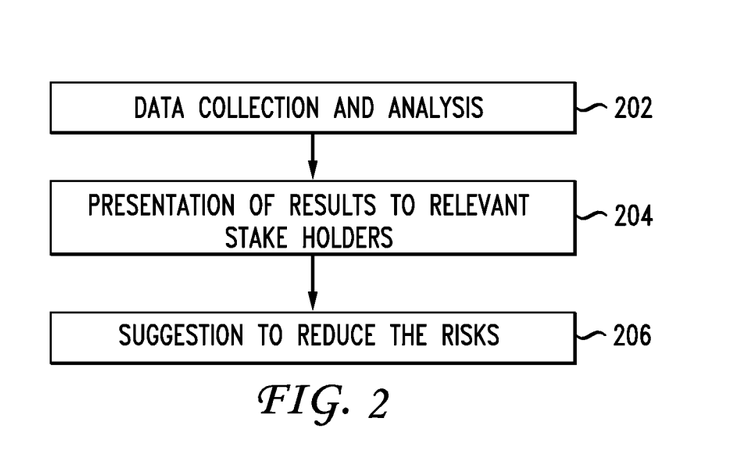
FIG. 2 illustrates an example high-level flow for identifying and reducing risks in software development.

FIG. 2 illustrates an example high-level flow for identifying and reducing risks in software development. The example system collects and analyzes data 202 describing customer-reported defects and corresponding portions of the source code and changes made in response to those customer-reported defects in order to determine which files or sections of the source code are the highest risk. Then the system can present the results of the analysis to the relevant stakeholders 204, and can further make suggestions to reduce or remediate those risks 206.

Figure 3:
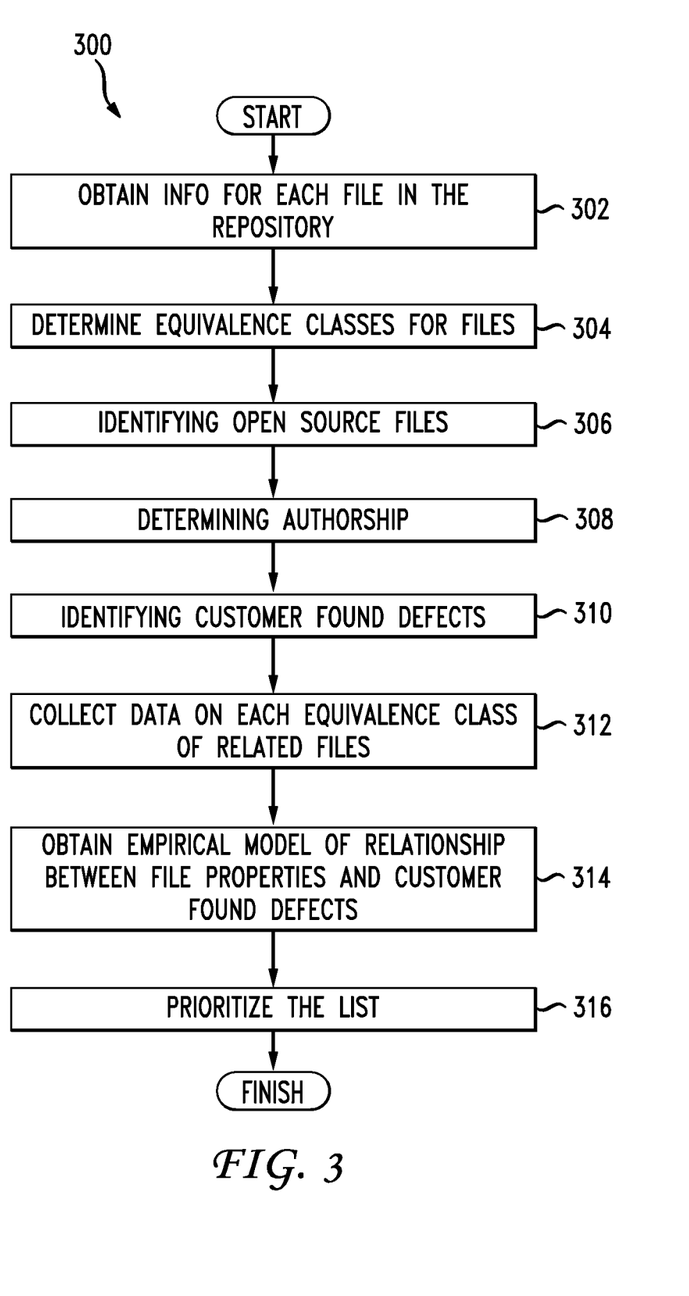
FIG. 3 illustrates an example detailed flow of the data collection and analysis step in FIG. 2.

FIG. 3 illustrates an example detailed flow of the data collection and analysis step in FIG. 2. In the data collection and analysis step 202, an example system gathers data about each file in a set of source code repositories 302, and prioritizes the files based on risk factors to identify a candidate set of riskiest files, which usually includes approximately 1% of all files in a project, using a weighted algorithm based on the empirical results. The set of source code repositories depends on the projects being analyzed, and the system can consider all or part of the repositories associated with each project. In the simplest case, the system analyzes one project with one code repository. One source of risk factors is the commit data describing which developers committed which changes to source code files. Commit data can include, for each revision of every file in each source code repository, a path name that uniquely identifies the file in the repository. Pathnames may be different for each branch. Commit data can also include author, date, commit message, and the content of the commit. The system can process the content of the file to obtain an Abstract syntax tree (AST), and size in lines of code or in bytes.

The system can determine equivalence classes for files 304. The system examines commits of all examined files. If some version v1 of file f1 matches some version v2 of file f2 (matches means that they have identical content or that they have an identical Abstract Syntax Tree) the files f1 and f2 are considered to be "related." Typically, the same file may be modified in multiple branches or even different repositories, in situations when the same code is used in multiple projects. The "related" relationship is transitively closed, i.e., if f1 is related to f2, and f2 is related to f3, then f1 is also related to f3 even if f1 and f3 may not have a single version with the same content or AST.

The system can identify Open Source Software (OSS) files 306. For each equivalence class of the related files identified above, the system can compare each version of each file to a large repository of unique versions of OSS files. If a match is found, the equivalence class of related files is considered to be of OSS file origin, or to incorporate code from at least one OSS file.

The system can determine authorship 308 by accessing a corporate personnel directory to determine, for each author identified as creating or modifying a file in the source code, if the author is an active employee. If the author is an active employee, the system can retrieve information from the personnel directory, such as the employee's name, phone number, email address, or other available information. If the author is not an active employee, any available information about that author can be retrieved, such as a former corporate personnel directory profile, or public social network information.

The system can identify customer found defects (CFDs) 310 and other change request attributes. A change request in a version control system often contains a field that identifies the development lifecycle phase during which an issue is identified. The system can identify as CFDs those change requests where the issue was identified after the project was released or made generally available to customers or users. The system can obtain the change request date and change request abstract (a one-line summary describing the change request) that are CFDs associated with each file. In addition to identifying CFDs, the system can also identify change requests that are identified in other lifecycle phases, and in particular, change requests identified during a system verification phase. In addition to selecting change requests based on the issue identification phase, this approach can be adapted to select change requests based on other factors maintained by the issue tracking system for each change request. These other factors can include change request severity, change request topic (such as "security issue" or "performance issue"), or time to resolve the change request among others depending on the individual issue tracking system. Each attribute could lead to a different type of risk: security/vulnerability risk, risk of delays for files that have long lead-times, and so forth.

The system can collect data associated with each equivalence class of related files 312. The data collected applies to each file in equivalence class. For example, the system can gather data describing authors of files, the number of commits to that file from that author, the number of overall commits from that author, ranges of commit dates from that author, a number of authors who have since left the development organization (such as a company or software development team), a number of commits per file or per project, a number, type, or age of related files, or a last commit date for each of the related files in the equivalence class. The system can gather other data describing the size of the file at the last commit (of the file that has the last commit date), the largest file size over all related files and all commits, the number of nonempty commits in all repositories for a given file, a file size in lines of code as of the last commit, the number of authors for each file, an average number of authors over all the files, an average number of commits over all the files, and so forth. The system can collect and calculate all change request issue IDs, a number of unique CFDs, a number of unique System Verification (SV) change requests, a number of unique security change requests, or the total lead time of the change requests resolved in the file. The system can collect any or all of these factors, and can also include other data points describing files in an equivalence class that are or may be indicative of "riskiness" of a source code file.

The system can obtain an empirical relationship between properties of the file and CFDs 314 optionally using statistical models 314. For example, the system can choose all commits to the project's version control system for a period of time, such as a three year period or some other duration, and fit a logistic regression model with an observation representing a single file. The response can include whether or not the file had a CFD, and the predictors can include various factors that have been shown to be associated with defects empirically. For example, in several projects the most important predictors of future CFDs can be the number of past changes associated with prior CFDs, the number of SV change requests, and the number of authors who have since left development.

The system can prioritize the list 316 of files to identify those files or code passages in the source code repository that have a highest likelihood of being 'risky' based on the analyzed file properties. For example, the system can prioritize the list by weighting the most important predictors. In one example, the system can weight the predictors using the following example:

$$0.55 \times \ln(nD) + 0.9 \times \ln(nAL) + 1.6 \times \ln(nSV) + 0.5 \times \ln(nSW),$$

where nD is the number of past changes; nAL is the number of authors who left; nSV is the number of unique system verification change requests; and nSW is the number of static analysis warnings. The system can apply other weight values and other factors. The system can apply different weightings to different portions of the source code or to different file types. In another variation, different weighting algorithms can be applied to different age brackets of source files. The system can likewise extend this approach beyond individual files to modules or collections of files making up a software component or package. In this case, the system can combine the characteristics of a module by calculating an aggregation of the characteristics of the individual files making up the module. The system may base risk on customer issues as well as other aspects such as security vulnerabilities or desired performance attributes.

In the presentation of results step 204, the system can present the analysis results to the relevant stakeholders, or can generate a report summarizing the results. In one embodiment, the system provides a stakeholder exploration view as an online dynamic table or downloadable spreadsheet, for example. An example online dynamic table that displays the results of the analysis can present a sorted prioritized list of candidate risky files and their characteristics for use by project managers and subject matter experts. In one example, different tables results or different portions of the table can be tailored to the needs, interests, and skills of a particular stakeholder, so that the project manager sees the priority of the risk and an estimate of resources or time to remediate the risk, whereas a subject matter expert sees more technical details of what the type of risk is, what underlying technical details led to the file or module being classified as risky, and so forth. The system can further sort the results for stakeholder exploration purposes based on any of the file characteristics and/or stakeholder preferences for analyzing the data. Some example file characteristics are provided in the table below:

| TYPE OF DATA | DESCRIPTION OF DATA |
| --- | --- |
| List of CFDs | A link to the CFD, the date, and an abstract are provided by the tool to aid the subject matter expert in understanding the defect that the file contributed to. |
| List of Related Files | The name of each related file, last commit date, first commit date, number of commit, and last author to make the commit are identified by the tool. The list can be sorted by most recent commit date. |
| List of File authors | The name, email address, phone number, number of deltas made by the author, and total number of deltas made by the author to all |

| TYPE OF DATA | DESCRIPTION OF DATA |
|---|---|
| | related files are provide by the tool. In addition the first and last date that the author made commits can be provided. The list can be sorted by number of deltas made by the author. |
| List of all change requests | A link to the change request, the date of the change request, a change request abstract, and an indication of whether the change request is a CFD is provided by the tool for each change request against the file. The list is sorted by most recent date. |
| Lines of Code | The size of the file in lines of code (LOC) are provided as well as the percentage of the size of the file compared to its maximum size. |

Data Details for a Candidate Risky File

The online tool can further provide a detailed view of each candidate risky file including related files, authors, CFDs and change requests associated with the file. A subject matter expert can use the detailed view along with the heuristics or recommendations outlined below to determine the best course of action for the file.

As part of the analysis results, the system can provide suggestions 206 for remediating the risk. The suggestions can include a checklist of heuristics based on the experience and empirical data to help the subject matter expert take the most appropriate action, whether that action is "no action," "control program," "reengineering," or some other action. For each candidate or indicated risky file, the subject matter expert can analyze the file or module and any associated data. The system can provide an optional guideline, based on empirical data of previous actions taken to remediate risks. No action may be required, if, for example, development is complete for this file; the candidate file will not be used in the near future; the candidate file is changed with a risky file, but is not itself risky.

The subject matter expert can establish a control program involving additional review and testing of all changes to the file to mitigate risk from changes to the file. For example, if the file has many authors or other reasons warrant, the file owner can create a 1-page design guidance document that is available for anyone who changes the file. The same design guidance document may also apply to a set of files that all contribute to the same component or feature. Similarly, a developer test guidance document can be created. The design and test guidance document may apply to a group of files. The subject matter expert can review results from or request that the system perform static analysis reflecting any changes made to the file. The system can present links or snippets from code inspection of all changes including the file owner and at least one other subject matter expert in addition to the author as reviewers. The system can create, propose, or execute unit tests that reflect changes to the file, and can automate those tests where possible and add them to the integration build tests, optionally with the permission or approval of the subject matter expert. The system can notify functional test and system verification staff whenever a change involving a risky file is included in the software base.

If the file is determined to by the expert to be too fragile, complex, or poorly structured to support continued changes, the expert is guided to recommend that the file be reengineered (e.g. re-factored). The system can include design and test guidance for the refactored file as part of the recommendation. The system can further create or suggest automated tests for the refactored file to ensure that the refactored file does not break compatibility with the project specifications or with other modules relying on the refactored file. The system can also provide a resource estimate for development time and test effort to perform the refactoring as part of the recommendation, as well as an effort estimate to automate the tests.

The system can determine, for each file or module that is determined to be above a particular risk threshold, a risk category, and assign review of that file or module to a specific subject matter expert or group of subject matter experts who have experience in that type of risk or who have skills enabling them to effectively identify and remediate that type of risk.

A project development leader can address all files that have no remaining authors, or files for which the system determines that the risks are beyond the scope of the remaining authors. Files or modules identified as risky can be assigned on a per-file or per-module basis, as well as on a directory level basis, where a file owner is responsible for all files in the directory and in any sub-directories. The system can provide recommendations for the assigned developer for a given file, its risk, and suggested remediation approaches. The system can provide relevant information to the assigned developer, including materials to educate the developer on the file and its surrounding context, suites of automated tests associated with the file, documentation or records describing code changes to file including participation in code inspections and review of test plans, and design and test guidance for the file.

This integrated approach identifies risky areas in the code base of a product and can reduce the risk in those files. The analytic part of the system can include tools that utilize commonly available data sources from version control, issue tracking, and personnel directories. The system can use the collected measures to present a set of candidate risky files in conjunction with additional information to aid subject matter experts in determining the nature and severity of risk in each file. The system can provide a tool, such as via an online interface, augmented by a checklist that suggests the most relevant actions depending on the file characteristics. The system can provide or suggest training for subject expert developers to remediate that risk.

Figure 4:
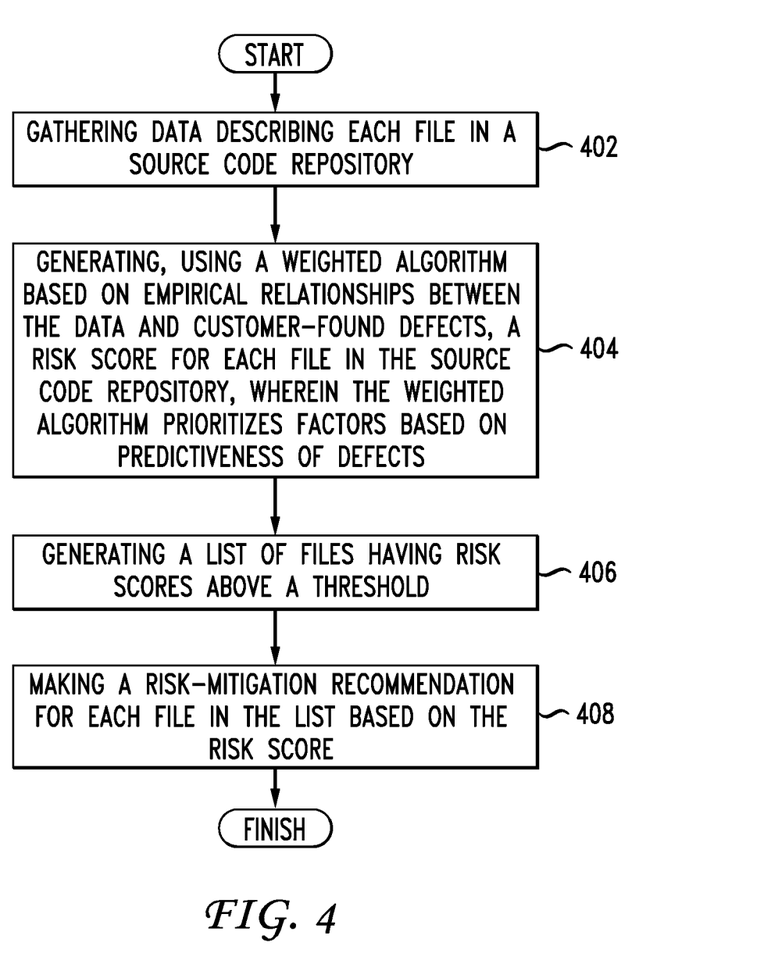
FIG. 4 illustrates an example method embodiment.

Having disclosed some basic system components and concepts, the disclosure now turns to the exemplary method embodiment shown in FIG. 4. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

FIG. 4 illustrates an example method embodiment for identifying risky files based on empirical data of customer-found defects, and making recommendations to remediate the associated risk. An example system can gather data describing each file or collection of files, such as a module, in a source code repository (402). The system can analyze files to determine equivalence classes including files that are within a similarity threshold, or that are identical at at least one version. For such files, the system can generate a collective risk score for each equivalence class based on one file in the equivalence class. In this way, the system can reduce the amount of processing and analysis. The system can identify equivalence classes or individual files as originating in open source, and can incorporate or retrieve previous risk analysis results for open source or other files, if the files have metadata (changes and customer defects) not changed since the previous risk suitable analysis. Alternatively, the system can modify results from a previously performed risk analysis based on events and information for the time period after the last risk analysis.

The system can generate, using a weighted algorithm based on empirical relationships between the data and customer-found defects, a risk score for each file in the source code repository, wherein the weighted algorithm prioritizes factors based on predictiveness of defects (404). The system can consider factors including at least one of, but not limited to, file name, number of related files, number of differences in the file in a commit history, current number of lines of code, fraction of current number of lines of code to the maximum number of lines of code in the history of the file, number of authors, fraction of authors who have left active development of the file, number of customer found defects contributed by the file, ratio of customer found defects to the total number of change requests contributed by the file, indication of whether or not the file is an open source file, file path name uniquely identifying the file in the repository, author, creation date, last edit date, commit message, content of a latest version of the file, abstract syntax try of a given version of the file, file size in bytes, or file size in lines of code.

The system can generate a list of files having risk scores above a threshold (406), and make a risk-mitigation recommendation for each file in the list based on the risk score (408). The system can optionally identify, for each file in the list of files having risk scores above the threshold, a respective risk type, and make the risk-mitigation recommendation for each file based on the respective risk type. The system can identify and assign a subject matter expert to files having risk scores above the threshold, and can further identify and assign subject matter experts based on their respective experience or areas of expertise and the risk types. The system can present the list of files and corresponding risk-mitigation recommendations via at least one of an online portal or an interactive spreadsheet.

While specific implementations are described herein, it should be understood that this is done for illustration purposes only. Other components and configurations may be used without parting from the spirit and scope of the disclosure.

Figure 5:
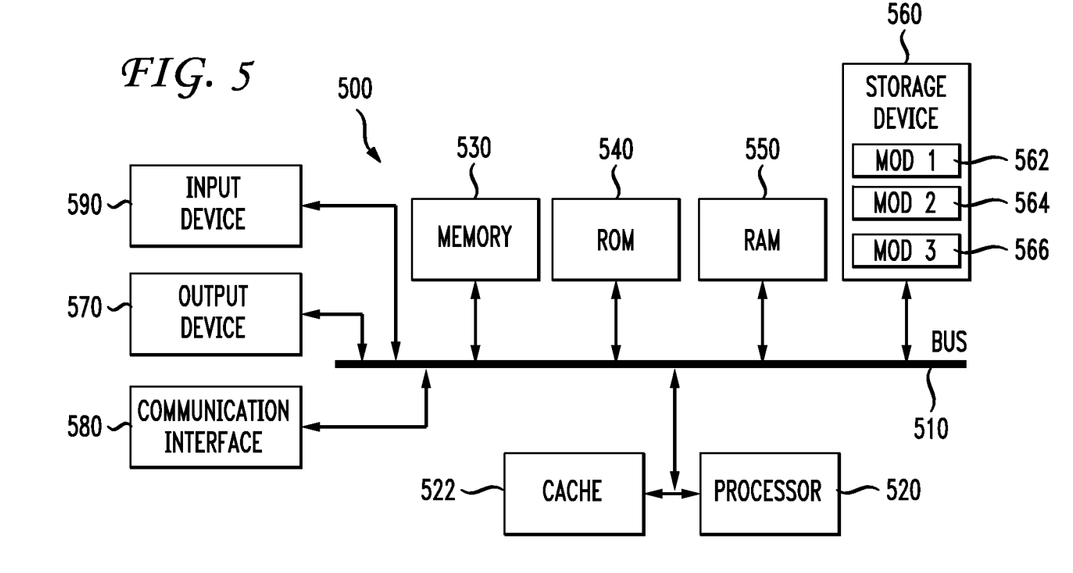
FIG. 5 illustrates an example system embodiment.

A brief description of a basic general purpose system or computing device in FIG. 5 which can be employed to practice the concepts is disclosed herein. With reference to FIG. 5, an exemplary system 500 includes a general-purpose computing device 500, including a processing unit (CPU or processor) 520 and a system bus 510 that couples various system components including the system memory 530 such as read only memory (ROM) 540 and random access memory (RAM) 550 to the processor 520. The system 500 can include a cache 522 of high speed memory connected directly with, in close proximity to, or integrated as part of the processor 520. The system 500 copies data from the memory 530 and/or the storage device 560 to the cache 522 for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 5 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, read only memory (ROM) 540, and the like, may also be used in the exemplary operating environment. Computer-readable storage media, computer-readable storage devices, or computer-readable memory devices, expressly exclude transitory media such as waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations described below, and random access memory (RAM) 550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited tangible computer-readable storage media. Such logical operations can be implemented as modules configured to control the processor 520 to perform particular functions according to the programming of the module. For example, FIG. 5 illustrates three modules Mod1 562, Mod2 564 and Mod3 566 which are modules configured to control the processor 520. These modules may be stored on the storage device 560 and loaded into RAM 550 or memory 530 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
gathering data describing each file in a source code repository;
generating, using a weighted algorithm based on empirical relationships between the data and customer-found defects, a risk score for each file in the source code repository, wherein:
the empirical relationships are based on empirical data of previous actions taken to remediate risks;
the weighted algorithm is adapted on a per-product basis based on at least one of a number of past changes associated with prior customer found defects, a number of change requests, or a number of authors who have left development; and
the weighted algorithm comprises $a \times \ln(nD) + b \times \ln(nAL) + c \times \ln(nSV) + d \times \ln(nSW)$, in which a, b, c and d are constants and nD represents a number of past changes, nAL represents a number of authors who have left development, nSV represents a number of change requests, and nSW represents a number of static analysis warnings;
generating, via a processor, a list of files having risk scores above a threshold; and
making a risk-mitigation recommendation for each file in the list based on the risk score.

2. The method of claim 1, wherein each file comprises one of a single file or a collection of files.

3. The method of claim 1, further comprising:
identifying, for each file in the list of files having risk scores above the threshold, a respective risk type; and making the risk-mitigation recommendation for each file based on the respective risk type.

4. The method of claim 1, further comprising:
identifying and assigning a subject matter expert to files having risk scores above the threshold.

5. The method of claim 1, further comprising:
presenting the list of files and corresponding risk-mitigation recommendations via one of an online portal or an interactive spreadsheet.

6. The method of claim 1, wherein the factors comprise one of file name, number of related files, number of differences in the file in a commit history, current number of lines of code, fraction of current number of lines of code to the maximum number of lines of code in the history of the file, number of authors, fraction of authors who have left active development of the file, number of customer found defects contributed by the file, ratio of customer found defects to the total number of change requests contributed by the file, indication of whether or not the file is an open source file, file path name uniquely identifying the file in the repository, author, creation date, last edit date, commit message, content of a latest version of the file, abstract syntax try of a given version of the file, file size in bytes, or file size in lines of code.

7. The method of claim 1, further comprising:
analyzing files to determine equivalence classes comprising files that are within a similarity threshold; and
generating a collective risk score for each equivalence class.

8. The method of claim 7, further comprising:
determining whether an equivalence class has been derived from an open source file.

9. The method of claim 1, wherein a=0.55, b=0.9, c=1.6, and d=0.5.

10. A system comprising:
a processor; and
a computer-readable storage medium storing instructions which, when executed by the processor, cause the processor to perform operations comprising:
gathering data describing each file in a source code repository;
generating, using a weighted algorithm based on empirical relationships between the data and customer-found defects, a risk score for each file in the source code repository, wherein:
the empirical relationships are based on empirical data of previous actions taken to remediate risks;
the weighted algorithm is adapted on a per-product basis based on at least one of a number of past changes associated with prior customer found defects, a number of change requests, or a number of authors who have left development; and
the weighted algorithm comprises $a \times \ln(nD) + b \times \ln(nAL) + c \times \ln(nSV) + d \times \ln(nSW)$, in which a, b, c and d are constants and nD represents a number of past changes, nAL represents a number of authors who have left development, nSV represents a number of change requests, and nSW represents a number of static analysis warnings;
generating a list of files having risk scores above a threshold; and
making a risk-mitigation recommendation for each file in the list based on the risk score.

11. The system of claim 10, wherein each file comprises one of a single file or a collection of files.

12. The system of claim 10, the computer-readable storage medium further storing instructions which result in operations further comprising:
identifying, for each file in the list of files having risk scores above the threshold, a respective risk type; and
making the risk-mitigation recommendation for each file based on the respective risk type.

13. The system of claim 10, the computer-readable storage medium further storing instructions which result in operations further comprising:
identifying and assigning a subject matter expert to files having risk scores above the threshold.

14. The system of claim 10, the computer-readable storage medium further storing instructions which result in operations further comprising:
presenting the list of files and corresponding risk-mitigation recommendations via one of an online portal or an interactive spreadsheet.

15. A non-transitory computer-readable storage device storing instructions which, when executed by a computing device, cause the computing device to perform operations comprising:
gathering data describing each file in a source code repository;
generating, using a weighted algorithm based on empirical relationships between the data and customer-found defects, a risk score for each file in the source code repository, wherein:
the empirical relationships are based on empirical data of previous actions taken to remediate risks;
the weighted algorithm is adapted on a per-product basis based on at least one of a number of past changes associated with prior customer found defects, a number of change requests, or a number of authors who have left development; and
the weighted algorithm comprises $a \times \ln(nD) + b \times \ln(nAL) + c \times \ln(nSV) + d \times \ln(nSW)$, in which a, b, c and d are constants and nD represents a number of past changes, nAL represents a number of authors who have left development, nSV represents a number of change requests, and nSW represents a number of static analysis warnings prioritizes factors based on predictiveness of defects;
generating a list of files having risk scores above a threshold; and
making a risk-mitigation recommendation for each file in the list based on the risk score.

16. The non-transitory computer-readable storage device of claim 15, storing additional instructions which result in operations further comprising:
analyzing files to determine equivalence classes comprising files that are within a similarity threshold; and
generating a collective risk score for each equivalence class.

17. The non-transitory computer-readable storage device of claim 16, storing additional instructions which result in operations further comprising:
identifying an equivalence class as an open source file.

18. The non-transitory computer-readable storage device of claim 15, wherein a=0.55, b=0.9, c=1.6, and d=0.5.

* * * * *